United States Patent
Jarvie et al.

(10) Patent No.: US 10,216,819 B2
(45) Date of Patent: *Feb. 26, 2019

(54) AUTOMATED IDENTIFICATION OF COMPLEX TRANSFORMATIONS AND GENERATION OF SUBSCRIPTIONS FOR DATA REPLICATION

(71) Applicant: International Business Machines Corporation, Armonk, NY (US)

(72) Inventors: Rachel L. Jarvie, Haymarket, VA (US); Nick Marcovecchio, Appin (CA); Gregg W. Miller, Apex, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/664,322

(22) Filed: Mar. 20, 2015

(65) Prior Publication Data

US 2016/0275159 A1    Sep. 22, 2016

(51) Int. Cl.
| | |
|---|---|
| *G06F 9/44* | (2018.01) |
| *G06F 17/30* | (2006.01) |
| *H04L 29/08* | (2006.01) |
| *G06F 8/51* | (2018.01) |
| *G06F 8/76* | (2018.01) |
| *G06F 8/65* | (2018.01) |

(52) U.S. Cl.
CPC ......... *G06F 17/30575* (2013.01); *G06F 8/51* (2013.01); *G06F 8/76* (2013.01); *G06F 17/30132* (2013.01); *G06F 17/30179* (2013.01); *G06F 17/30569* (2013.01); *H04L 67/1095* (2013.01); *G06F 8/65* (2013.01)

(58) Field of Classification Search
CPC .................... G06F 21/6218; G06F 21/6227
See application file for complete search history.

(56) References Cited

U.S. PATENT DOCUMENTS

| | | |
|---|---|---|
| 5,953,534 A | 9/1999 | Romer et al. |
| 7,409,675 B2 | 8/2008 | Brumme et al. |
| 8,521,706 B2 | 8/2013 | Alpern et al. |

(Continued)

FOREIGN PATENT DOCUMENTS

| | | |
|---|---|---|
| CN | 101162428 A | 4/2008 |
| CN | 101425078 A | 5/2009 |
| CN | 102118500 A | 7/2011 |

OTHER PUBLICATIONS

Dumitras et al. ("No Downtime for Data Conversions: Rethinking Hot Upgrades," Jul. 2009).*

(Continued)

*Primary Examiner* — Li B. Zhen
*Assistant Examiner* — Lenin Paulino
(74) *Attorney, Agent, or Firm* — Robert Shatto; Edell, Shapiro & Finnan, LLC

(57) ABSTRACT

According to embodiments of the present invention, machines, systems, methods and computer program products as part of a data replication process are provided. One or more complex transformations are identified from source code files of installed software products on a target system. A subscription is created for each complex transformation, the subscription containing instructions for transforming data within the source system into a form compatible with the target system. The instructions are executed within the target system to transform source data of the source system into a form compatible with the target system.

14 Claims, 12 Drawing Sheets

(56) References Cited

U.S. PATENT DOCUMENTS

| | | |
|---|---|---|
| 8,813,046 B2 | 8/2014 | Nair et al. |
| 2003/0120665 A1* | 6/2003 | Fox .................. G06F 17/30557 |
| 2004/0172637 A1 | 9/2004 | Koutyrine |
| 2004/0267843 A1 | 12/2004 | Dinh et al. |
| 2006/0143222 A1 | 6/2006 | Daniel |
| 2009/0249076 A1* | 10/2009 | Reed ..................... G06Q 30/00 713/181 |
| 2010/0030730 A1* | 2/2010 | Shang .............. G06F 17/30575 707/637 |
| 2010/0185634 A1* | 7/2010 | Eggebraaten ....... G06F 17/3092 707/756 |
| 2010/0269096 A1 | 10/2010 | Araya et al. |
| 2010/0281475 A1* | 11/2010 | Jain ......................... G06F 8/658 717/172 |
| 2011/0099294 A1* | 4/2011 | Kapur .................... H04L 67/02 709/246 |
| 2011/0283270 A1* | 11/2011 | Gass ........................ G06F 8/65 717/168 |
| 2011/0314000 A1* | 12/2011 | Chaudhuri ........ G06F 17/30463 707/718 |
| 2012/0330925 A1* | 12/2012 | Ramamurthy .... G06F 17/30448 707/718 |
| 2013/0254752 A1* | 9/2013 | Nair ....................... G06F 9/454 717/137 |
| 2015/0350016 A1* | 12/2015 | Gundugola ........... H04L 41/145 709/223 |

OTHER PUBLICATIONS

Dumitras et al.,"No Downtime for Data Conversions: Rethinking Hot Upgrades," Jul. 2009 (Year: 2009).*

List of IBM Patents or Patent Applications Treated As Related, Dec. 2015, 1 page.

Magill et al., "Automating Object Transformations for Dynamic Software Updating", OOPSLA'12, Oct. 19-26, 2012, Tucson, Arizona, Copyright 2012, 16 pages.

Dumitras et al., "No Downtime for Data Conversions: Rethinking Hot Upgrades", Carnegie Mellon University, Pittsburgh, PA, CMU-PDL-09-106, Jul. 2009, 9 pages.

International Search Report and Written Opinion dated Jul. 21, 2016, 12 pages.

* cited by examiner

EXAMPLE OF A GENERATED USER EXIT

FIG.6A

```
public class assetmeterUE implements UserExitIF
{
    private Connection conn;
    public void init(ReplicationEventPublisherIF p_Publisher) throws UserExitException
    {
    p_Publisher.subscribeEvent(ReplicationEventTypes.AFTER_INSERT_EVENT);
    p_Publisher.subscribeEvent(ReplicationEventTypes.AFTER_UPDATE_EVENT);
    }
    public void finish()
    {
    }
    public boolean processReplicationEvent(ReplicationEventIF p_Event) throws UserExitException
    {
        CallableStatement cstmt;
        Statement stmt;
        try
        {
            if (conn == null) {
            conn = p_Event.getSharedConnection();
            }
            int id = p_Event.getData().getInt("ASSETMETERID");
            cstmt = conn.prepareCall("{call assetmeter_cdc.clear_predicate}");
            cstmt.execute();
            cstmt.close();
            cstmt = conn.prepareCall("{call assetmeter_cdc.set_predicate(?)}");
            cstmt.setInt(1, id);
            cstmt.execute();
            cstmt.close();
            cstmt = conn.prepareCall("{call measurement_cdc.clear_predicate}");
            cstmt.execute();
            cstmt.close();
            cstmt = conn.prepareCall("{call
```

⎫
⎬ 610
⎭

```
            }
            catch (DataTypeConversionException dtce)
            {
            throw new UserExitException(dtce.getMessage());
            }
            catch (SQLException sqle)
            {
            throw new UserExitException(sqle.getMessage());
            }
            catch (Exception e)
            {
            e.printStackTrace();
            throw new UserExitException(e.getMessage());
            }
            return true;
    }
}
```

ADDITIONAL EXAMPLES OF GENERATED USER EXITS
IN THE FOLLOWING EXAMPLES OF MULTIPLE SQL TRANSFORMATIONS AND
SOURCE CODE TRANSFORMATIONS, FGAC IS SET ON TABLES SPECIFIC TO THIS
TRANSACTION, SINCE THE TABLES ARE AFFECTED BY THE CURRENT TABLE
TRANSACTION

```
public class workorderUE implements UserExitIF
{
    private Connection conn;
    public void init(ReplicationEventPublisherIF p_Publisher) throws
UserExitException
    {
            p_Publisher.subscribeEvent(ReplicationEventTypes.AFTER_INSERT_EVENT);
            p_Publisher.subscribeEvent(ReplicationEventTypes.AFTER_UPDATE_EVENT);
    }
    public void finish()
    {
    }
    public boolean processReplicationEvent(ReplicationEventIF p_Event) throws
UserExitException
    {
    CallableStatement cstmt;
    Statement stmt;
```

IN THIS EXAMPLE, FGAC IS ONLY SET FOR THE TABLE THIS TRANSACTION IS FOR,
E.G., THE WORKORDER TABLE.

```
            try
            {
                    if (conn == null) {
                    conn = p_Event.getSharedConnection();
                    }
                    int id = p_Event.getData().getInt("WORKORDERID");
                    cstmt = conn.prepareCall("{call workorder_cdc.clear_predicate}");
                    cstmt.execute();
                    cstmt.close();
                    cstmt = conn.prepareCall("{call
workorder_cdc.set_predicate(?)}");
                    cstmt.setInt(1, id);
                    cstmt.execute();
                    cstmt.close();
```

⎫
⎬ 640
⎭

```
        // Call complex transformation scripts in order here
        // perform update SQL from dbc file
stmt = conn.createStatement();
stmt.executeUpdate("update maxrelationship set
whereclause='exists (select 1 from workorder where workorderid = commlog.ownerid
and woclass = commlog.ownertable and workorder.wogroup = :wogroup and
workorder.siteid = :siteid )' where name='COMMLOG' and child='COMMLOG' and
parent='WORKORDER'");
stmt.close();
        // Call complex transformation scripts in order here
        // perform update SQL from dbc file
stmt = conn.createStatement();
stmt.executeUpdate("update maxview set viewwhere =
coalesce(viewwhere, '') || ' and wo.wonum not in (select tw.parent from workorder
tw where tw.siteid = wo.siteid and tw.istask = 1 and tw.parent = wo.wonum and
tw.parent is not null group by (tw.parent) except (select tw.parent from workorder
tw where tw.istask = 1 and tw.parent = wo.wonum and tw.siteid = wo.siteid and
tw.wonum not in (select ta.wonum from assignment ta, workorder wwa where ta.siteid
= wo.siteid and wwa.siteid = wo.siteid and wwa.parent = tw.parent and ta.status not
in (select value from synonymdomain where maxvalue = "WAITASGN" and domainid =
"ASSTAT")))) ' where viewname = 'UNASSIGNEDWORKVIEW'");
            stmt.close();
        // Call complex transformation scripts in order here
        // perform update SQL from dbc file
        stmt = conn.createStatement();
            stmt.executeUpdate("update maxviewcfg set viewwhere =
coalesce(viewwhere, '') || ' and wo.wonum not in (select tw.parent from workorder
tw where tw.siteid = wo.siteid and tw.istask = 1 and tw.parent = wo.wonum and
tw.parent is not null group by (tw.parent) except (select tw.parent from workorder
tw where tw.istask = 1 and tw.parent = wo.wonum and tw.siteid = wo.siteid and
tw.wonum not in (select ta.wonum from assignment ta, workorder wwa where ta.siteid
= wo.siteid and wwa.siteid = wo.siteid and wwa.parent = tw.parent and ta.status not
in (select value from synonymdomain where maxvalue = "WAITASGN" and domainid =
"ASSTAT")))) ' where viewname = 'UNASSIGNEDWORKVIEW'");
            stmt.close();
```

```
        cstmt = conn.prepareCall("{call workorder_cdc.clear_predicate}");
        cstmt.execute();                                                      ⎫
        cstmt.close(); this is similar to Fig 6, 630                          ⎬ 680
    }                                                                         ⎭
    catch (DataTypeConversionException dtce)
    {
            throw new UserExitException(dtce.getMessage());
    }
    catch (SQLException sqle)
    {
            throw new UserExitException(sqle.getMessage());
    }
    catch (Exception e)
    {
            e.printStackTrace();
            throw new UserExitException(e.getMessage());
    }
    return true;
  }
}
```

FIG.6G

AUTOMATED IDENTIFICATION OF COMPLEX TRANSFORMATIONS AND GENERATION OF SUBSCRIPTIONS FOR DATA REPLICATION

BACKGROUND

1. Technical Field

Present invention embodiments relate to data replication, and more specifically, to automatically identifying complex transformations and generating subscriptions for complex transformations of data during replication of data from a source system to a target system.

2. Discussion of the Related Art

Software upgrades typically result in large amounts of downtime. Typically, a system or database is taken offline and software upgrades are performed. Data may be identified and transformed using a manual and error prone process to place the data in a form that is compatible with the upgraded software.

For example, when moving data between code levels, e.g., a current version of a code level at a source system to an upgraded version of a code level at a target system, the underlying data model may change. Variables, tables, or portions of tables and so forth within the database of the source system may no longer be present or may have been transformed or combined within the database of the target system. In such cases, an administrator may need to manually review software code to identify such changes in the underlying data model to upgrade the data accordingly. Such processes may lead to lengthy downtimes with large amounts of loss in consumer productivity. Customers desire near zero system downtime when upgrading system product software.

SUMMARY

According to embodiments of the present invention, machines, systems, methods and computer program products for generating subscriptions as part of a data replication process are provided. One or more complex transformations are identified from source code files of installed software products on a target system. A subscription is created for each complex transformation, and contains instructions for transforming data within the source system into a form compatible with the target system. Each instruction is executed within the target system to transform source data of the source system into a form compatible with the target system. In preferred embodiments, complex transformations may utilize specific commands, e.g., SQL commands particular to a programming language of a database.

Accordingly, present invention embodiments include automating complex transformations of a data replication process. Present invention embodiments also include automatic generation of objects, e.g., system-wide objects, for replicating data from a source system to a target system having different code levels. An object may comprise computer executable instructions for transforming data. In preferred embodiments, subscriptions may comprise one or more objects or references to files comprising one or more objects. Original data on the source system can be transformed using the data objects and then replicated to the target system in real-time or near real-time. By automatically identifying complex transformations and generating corresponding subscriptions, data replication may be automated and performed in a more efficient manner, as compared with manually identifying complex transformations and transforming associated data by hand. Transformation use cases may be identified and corresponding transformation objects identified in an automated manner. Accordingly, system downtime from the data replication process may be reduced. Additionally, present invention embodiments provide a more accurate, reliable process, as compared to manually driven transformations, reducing errors from user-based transformation processes.

In preferred embodiments, the subscription file may provide fine grain access control (FGAC), limiting access or fine tuning access, to individual items of data to be transformed as part of the replication process. FGAC allows data in particular tables, columns, rows, variables, etc. to be transformed, while allowing other data to remain unaffected by the transformation. Accordingly, FGAC provides for automation of manually driven processes in an efficient, targeted manner, allowing data operations to occur on specific data without manual involvement.

In other preferred embodiments, fine grain access control may include, for a plurality of tables identified to be impacted by the complex transformation, determining a subset of the plurality of tables comprising data that is not to be transformed and inactivating access to this subset of tables. Accordingly, the complex transformation is performed only on the tables that have not been inactivated, allowing data operations to be performed on specific data.

In other preferred embodiments, the subscription may further comprise one or more references to one or more executable files containing instructions for transforming data, the instructions comprising generated source code. Generated source code files may be created by selecting a source code file of the target system containing a complex transformation, updating the source code file to transform data of the source system into a form compatible with the target system, and saving the updated/generated source code file, allowing complex transformations to be performed at a future point in time as part of a data replication process.

In still other preferred embodiments, an order of installation of the source code files of installed software products on the target system is obtained. The source code files are parsed in the order of installation to identify a corresponding order of the complex transformations, and a cache of complex transformations are generated, wherein each table in the cache lists the identified complex transformations in the corresponding order based on the respective source code file. Accordingly, identifying the ordering of the target system allows consistency and accuracy with regard to applying transformations in an ordered manner to the data to be replicated, as well as allows for multiple installed products and version combinations to be accounted for.

Other preferred embodiments include generating a report listing differences between the source system and the target system, identifying from the report, items of data that are present within the target system, with such items serving as input when generating a subscription. Generating a subscription for each complex transformation having a corresponding item of data in the target system. By identifying items that are no longer present with the target system, the data replication process may be further accelerated by reducing unnecessary computations.

These and other aspects, features and embodiments of the present invention will be understood with reference to the drawing figures and the detailed description herein, and may be realized by way of the various elements and combinations particularly pointed out in the appended claims. It is to be understood that both the foregoing general description and the following brief description of the drawings and detailed description are examples and explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

FIGS. 6A-6G show examples of user exits in accordance with embodiments of the present invention.

DETAILED DESCRIPTION

When moving data between code levels, e.g., a current version of a code level at a source system to an upgraded version of a code level at a target system, the underlying data model may have changed. Accordingly, it is desirable to limit system downtime from such data transformations. Present invention embodiments evaluate differences between the source code of the source system and the source code of the target system to identify complex transformations. Once these transformations are identified, objects may be automatically generated to perform complex transformations on data being replicated to the target system, as part of a data replication process, so that the data is compatible with the target system. Transformations may occur in real-time or near real-time. During replication, the objects may be executed, at the target system, on incoming data to transform the data into a compatible format with the target system.

Accordingly, preferred embodiments include automatic generation of objects for replicating data from a source system to a target system with different code levels. By automatically identifying complex transformations and generating corresponding subscriptions, data replication may be automated and performed in a more efficient manner, as compared to manually identifying complex transformations and transforming associated data by hand. Accordingly, system downtime from the data replication process may be reduced. Additionally, present invention embodiments provide a more accurate, reliable process, as compared to manually driven transformations, reducing errors from user-based manual transformations.

Additionally, in other preferred embodiments, identification of complex transformations and generation of corresponding objects may be performed prior to data replication in the upgrade process, and the data may be transformed immediately thereafter or at a future point in time.

Figure 1:
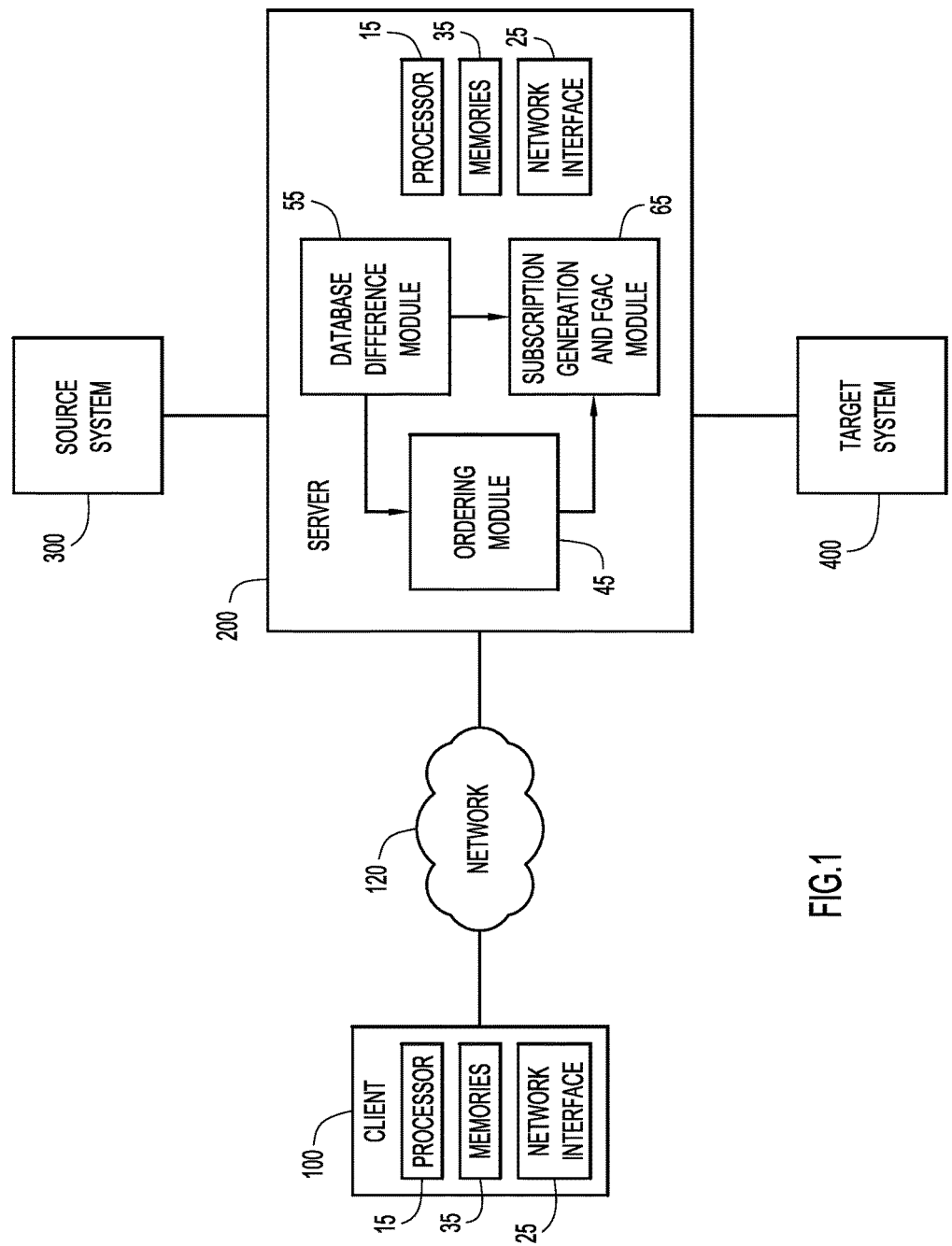
FIG. 1 is an illustration showing an example system for automatically generating subscriptions in accordance with an embodiment of the present invention.

An example environment for use with present invention embodiments is illustrated in FIG. 1. Specifically, the environment includes one or more client or end-user systems 100, and one or more server systems 200. Server system 200 and client system 100 may be remote from each other and communicate over a network 120. The network may be implemented by any number of any suitable communications media (e.g., wide area network (WAN), local area network (LAN), Internet, Intranet, etc.). Alternatively, server system 200 and client system 100 may be local to each other, and communicate via any appropriate local communication medium (e.g., local area network (LAN), hardwire, wireless link, Intranet, etc.).

Client system 100 enables users to connect remotely to server system 200 to manage identification of complex transformations and generation of corresponding objects as part of a data replication process. It is understood that present invention embodiments do not require a client system (presence of a client system is optional), and may operate independently from a client system. Server system 200 may connect to a source database or system 300 and a target database or system 400 to obtain various types of information needed for data replication. Server 200 may comprise a database difference module 55 to identify database schema and metadata differences between the source system 300 and the target system 400, a process and product ordering module 45 to determine source code levels between a source system and a target system and to determine the order in which various software applications have been installed, as well as a subscription generation and FGAC control module 65, which generates subscriptions, including FGAC, to be used during the process of data replication. In other embodiments, presence of a server system 200 is also optional.

A database system, e.g., source database or system 300 and target database or system 400, may store various information needed for object generation (e.g., product versions, release versions, build versions, dates of installation, types of transformations, e.g., simple or complex, database data, etc.). Subscription generation module 65 may be utilized to identify complex transformations and generate corresponding objects for data transformation. The source and target systems may be implemented by any conventional or other database or storage unit, may be local to or remote from server system 200 and client system 100, and may communicate via any appropriate communication medium (e.g., local area network (LAN), wide area network (WAN), Internet, hardwire, wireless link, Intranet, etc.). The client system 100 may present a graphical user (e.g., GUI, etc.) or other interface (e.g., command line prompts, menu screens, etc.) to connect to the server system 200 and view information relating to the data transformation process (e.g., cached ordered tables, product versions, product installation orders, subscriptions, database difference files, etc.).

Server system 200 and client system 100 may be implemented by any conventional or other computer system preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, modules 45, 55 and 65, browser/interface software, etc.).

In still other embodiments, presence of a client and/or a server is optional. A stand-alone mode of operation may be employed in which a computing system stores or has access to data (e.g., product versions, product installation orders, source and target code, etc.), and includes modules 45-65 to identify orderings, create subscriptions, identify system differences, etc. A graphical user (e.g., GUI, etc.) or other interface (e.g., command line prompts, menu screens, etc.) may solicit information from a corresponding user pertaining to the desired files and analysis, and may output generated source code files based on the analysis results.

A module may include one or more modules or units to perform the various functions of present invention embodiments described throughout this application. The various modules (e.g., ordering module 45, subscription generation module 65, database difference module 55, etc.) may be implemented by any combination of any quantity of software and/or hardware modules or units, and may reside within memory 35 of the server for execution by processor 15.

Present invention embodiments are compatible with any operating system including Linux®, Unix®, Windows®, etc. and is also executable in multi-platform environments and environments with multiple databases.

FIG. 1 also shows an example flow of data between modules in accordance with an embodiment of the present invention. The database difference module 55 may generate a database difference report comprising differences in schema and metadata between the source database and the target database that may be used by both ordering module 45 and subscription generation and FGAC module 65. The database difference report may comprise a listing of underlying changes to the system, e.g., variables, rows, columns, tables, etc., of the target system as compared to the source system. In some embodiments, ordering module 45 may utilize the information in the database difference report to determine whether a complex transformation involving a particular table, row, column or variable should be included in a cache of ordered transformations. In other embodiments, the database difference report may be utilized by subscription generation module 65 to determine whether to generate a subscription pertaining to a particular table, row, column or variable. Ordering module 45 may determine source code levels between a source system and a target system. The output of ordering module 45, which is the cache of ordered transformations, is then utilized by subscription generation and FGAC module 65 to generate subscriptions.

Figure 2:
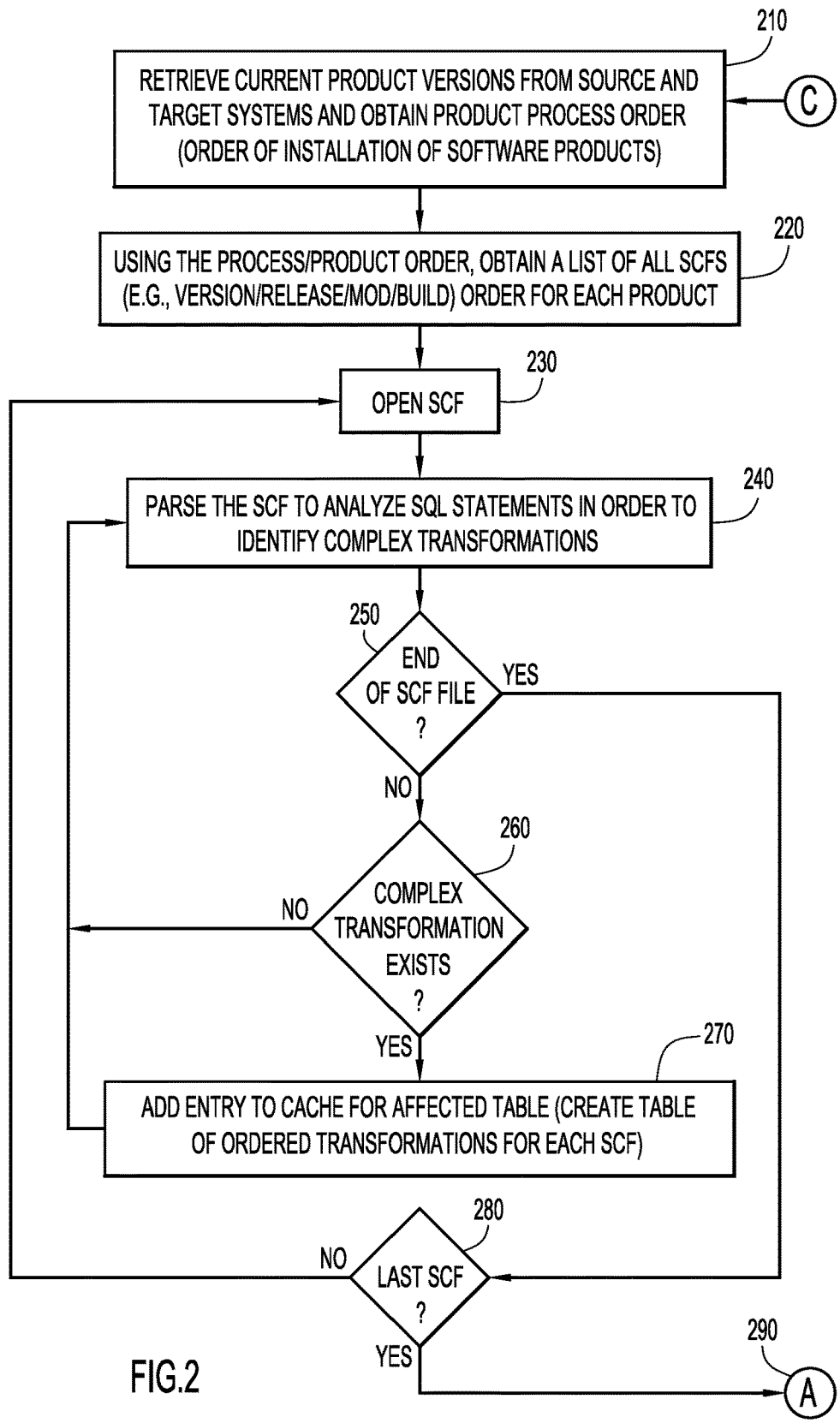
FIG. 2 is a procedural flowchart showing example operations of analyzing and caching ordered transformations in accordance with an embodiment of the present invention.

FIG. 2 shows an example flow chart for generating a cached table of ordered transformations, according to modules 45-55. Identifying the presence and ordering of the source and target systems allows consistency and accuracy with regard to ordering of data transformations within the target system.

At operation 210, current product versions from the source and target system are retrieved and a product process order (order of installation of software products) is obtained. For example, current product versions from the source database 300 and the target database 400 along with the process order (e.g., the order of the installed software code base, which may include installed customer, base product, add-ons, and industry software solutions for the source and target systems) are obtained. At operation 220, based upon the process/product order, a list of all source code files (SCFs) is obtained, including one or more of a software version, release, modification, build, etc., for each software product installed on the source system 300 (current software version) and the target system 400 (upgraded software version). SCFs can be in the form of files containing database language directives such as SQL commands or programming languages, such as Java, containing logic for construction of database language directives. By building a list of SCFs that are unique to the target, the corresponding software code may be scrutinized to determine what types of transformations have occurred as well as the order in which transformations have occurred.

At operation 230, an SCF is opened. At operation 240, the SCF is parsed to analyze Structured Query Language (SQL) statements within the SCF to identify transformations, e.g., simple or complex transformations. Identification of transformations may be performed using various search patterns. Simple transformations may include simple functions such as data type conversions, column length (substring), supplying default values for required fields, etc. Examples of complex transformations include transformations that span across multiple scripts, move data from multiple columns to one column, move data from multiple tables to one table, changing column data using a formula or algorithm, etc. At operation 250, it is determined whether the end of the SCF has been reached. If an end of file has been reached, at operation 280, it is determined whether another SCF is present in the list of SCFs for parsing. If another SCF is present in the list of SCFs within the process order list, the process continues at operation 230, and iterates through all available SCFs. If the last SCF in the process order file has been parsed, the process continues to "A" at block 290.

Referring to operation 250, if the end of the SCF has not been reached, at operation 260, SQL code (e.g., a line, block, or segment of code, etc.) may be evaluated to determine if a complex transformation exists in the code being evaluated. If a complex transformation exists, at operation 270, a hash of the table name and the SQL or SCF is cached in a table of ordered transformations. If a complex transformation does not exist, a subsequent portion of the SCF is parsed at operation 240.

Accordingly, each portion of code in each SCF may be parsed to identify complex transformations. The identified complex transformations are cached, e.g., by table name, reflecting the ordering of transformations as determined by the process order. The cache keeps track of the transformations found in each file, as well as interactions between transformations from multiple files. As an example, multiple SCFs may contain code which transforms data for the same table or transforms data for dependent tables.

The source SCFs and the target SCFs are compared to find differences between the two systems. Changes between the source and the target systems may be identified, e.g., additional files, different file versions, etc., and the process described in FIG. 2 may be utilized to identify and cache complex operations within SCF files. Accordingly in FIG. 1, SCFs that are common to both the source system 300 and the target system 400 may be excluded, and analysis limited to differences in SCFs between the source and target systems, thus, reducing unnecessary computation.

Figure 3:
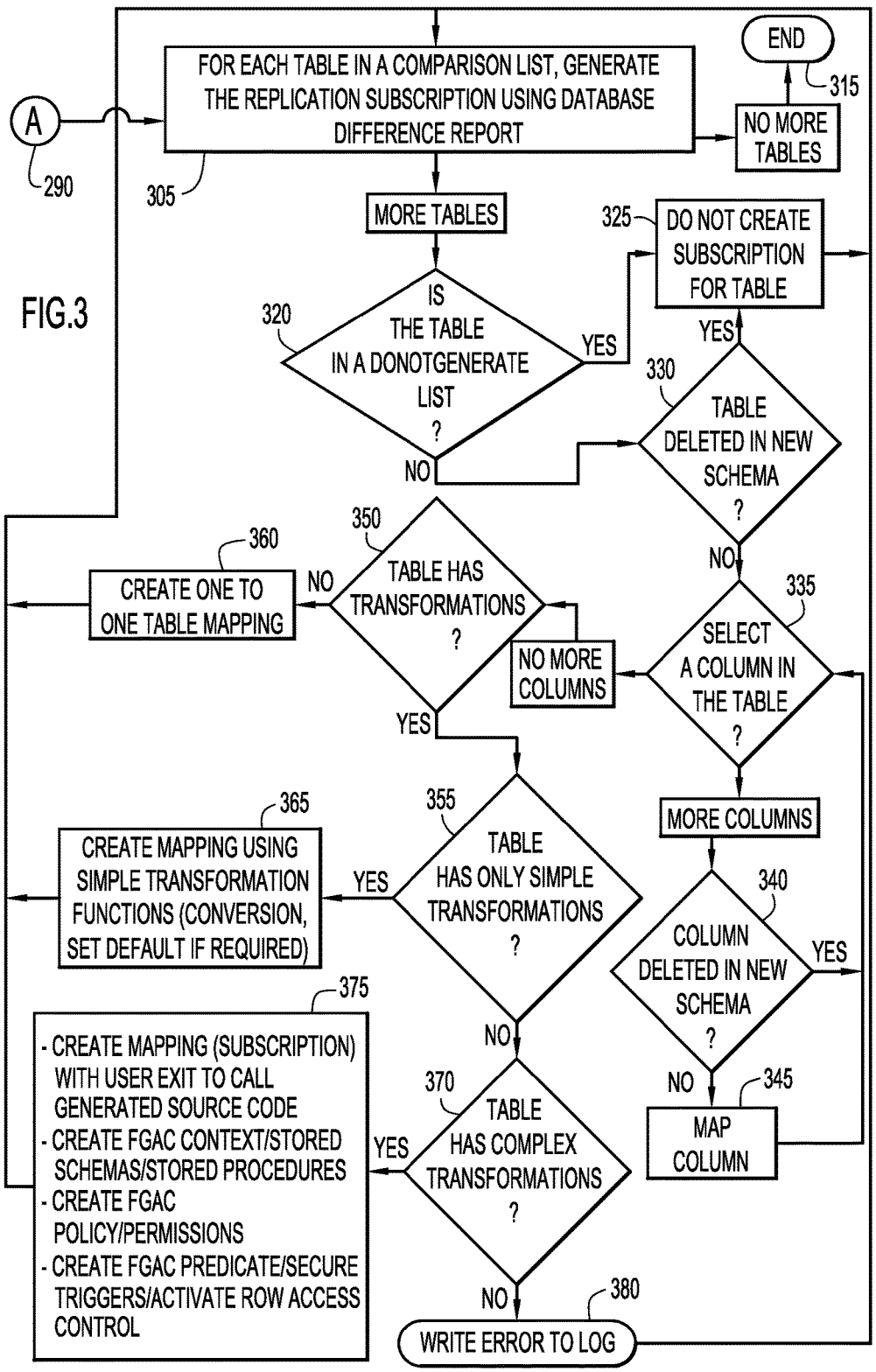
FIG. 3 is a procedural flowchart showing example operations of generating subscriptions in accordance with an embodiment of the present invention.

FIG. 3 shows a flow chart for creating subscriptions for transformations based upon information from database or system models (e.g., a database difference report), and an ordered table of transformations.

FGAC is also shown in the context of creating subscriptions for complex transformations. FGAC limits access or fine tunes access to individual items of data to be transformed. For example, FGAC allows data in particular tables, columns, rows, variables, etc. to be transformed, while allowing data in other tables to remain unaffected. FGAC may also be implemented to facilitate operating on one row of data at a time, thereby reducing computations (as compared to computing upon an entire table) during data replication.

In some embodiments, the target system may have undergone changes to the database model itself. Such changes may include changes in data types, changes in variable length, new columns, derived columns (e.g., columns that are generated from data in other columns), deleted tables, deleted columns or rows, and so forth. In order to replicate data from the source system 300 to the target system 400, underlying changes to the database or system model may be captured in a database difference report generated by module 55. The information in the database difference report along with a listing of ordered transformations may be used to generate replication subscriptions by module 65. Replication subscriptions may comprise a particular manner of combining data, a particular order of combining data, particular table(s), numbers and/or types of transformations, etc. By identifying items that are no longer present within the target system, the data replication process may be further accelerated by reducing unnecessary computation.

It is understood that additional logic may be added to FIG. 3 to capture additional aspects of changes to database or system models.

Once all SCFs are processed (from operation 280), at operation 305, the subscription generation process begins by selecting each table in a comparison list, a list formed by comparing the tables that exist in both the source and target databases, and generating the replication subscription using the database difference report. It is understood that this step will repeat as long as additional tables in the list are present, so that one or more subscriptions are created for each table in the list. Once each table in the list has been considered, the process completes at operation 315. Otherwise, the process proceeds to operation 320.

Operations 320-345 involve aspects of accounting for changes in a database or system model, e.g., as identified in a database difference file. At operation 320, it is determined whether the selected table is in a "doNotGenerate" list. If the table is present in the doNotGenerate list, a subscription will not be created for that table, as shown at operation 325. The doNotGenerate list allows a user to specify entire tables to be omitted from the subscription generation process. If the table is not included in the doNotGenerate list, then the process proceeds to operation 330.

At operation 330, it is determined whether a table is deleted in the new schema corresponding to the target system. For instance, if target system 400 no longer contains a selected table, then a subscription does not need to be created for that table as the target system 400 does not have a place to store corresponding data.

If a corresponding table is present in the target system, then the process continues to operation 335 to determine whether or not each column of the table has been retained in the target system 400. At operation 335, a column in the table is selected. Once a column is selected, at operation 340, it is determined whether the column has been deleted in the new schema (e.g., in the target system 400). If the column has been deleted, then a subscription will not be created for that column, and the process continues, with the next column being selected at operation 335. If the column is not deleted in the new schema, a subscription is created at operation 345, e.g., the column is mapped, and the process continues to operation 335. This process keeps track of each column for which a subscription is needed. In some embodiments, the database difference report shows which tables and columns are deleted, new, changed or have remained the same. If the column has changed, the database difference report may provide information on specific differences. A set of differences files may be created that hold table/column information for both the source and target systems. As processing is performed, the code may traverse through these files to build a temporary view of the information required for the final subscription. It is understood that this process repeats for each column in a table.

Once all columns have been evaluated, the process continues to operations 350-380, which handle subscription generation. At operation 350, it is determined whether the table contains transformations. If transformations are not present, then a one-to-one mapping, for each non-deleted column, is created within a subscription at operation 360, and the process proceeds to operation 305 to evaluate the next table. If transformations are present, then at operations 355 and 370, the type of transformation is determined, e.g., whether the transformation is simple or complex. If the type of transformation is determined to be simple, then within a subscription, a mapping using a simple transformation function (e.g., a data type conversion, column lengths, a substring or truncation, required fields with default values, etc.) is created at operation 365. If the type of transformation is determined to be complex, as shown at operation 370, then a subscription may be created, which may incorporate FGAC and one or more user exits, as shown at block 375. It is understood that if a table has both simple and complex transformations, each type will be handled appropriately.

In some embodiments, and with reference to block 375, a subscription may call out to a user exit containing generated source code, with the source code carrying out the transformation. A user exit is code that may run or call other source code. For example, a user exit may extend the capabilities of a system by calling other source code or an extended class of source code to perform a specified function, e.g., calling from within a Java program, an extended class within Java to perform a function.

According to preferred embodiments, a user exit comprising source code is automatically generated by the system, and the source code of the user exit may perform the data transformation, e.g., on a column-by-column basis. FGAC may be utilized to create context, create stored schemas or procedures, create policy or permissions, as well as create predicates, secure triggers, and activate row (or column or table) access control. Advantages of FGAC include limiting access to particular tables, rows, and columns of data as well as increasing efficiency of the data replication process.

Upon completion of operation 375 or of operation 365, the process continues at operation 305. If the table does not have any simple or complex transformations and does not include a one-to-one mapping, an error is written to the error log at operation 380, and the process continues to operation 305.

As previously discussed, one or more data transformations may need FGAC to be defined. Typical upgrades may update the entire table and all data within that table. When performing the replication process across systems, it may be desirable to update the database one row (or column) at a time, instead of an entire table, as data may be received at a target system one row (or column) at a time.

In preferred embodiments, computations from a subscription are performed on one row of data at a time, as the data is arriving at the target system from the source system, using FGAC, which provides the ability to operate on one row of data at a time. Accordingly, preferred embodiments create subscriptions along with all needed FGAC at the time the subscription is created, to execute as part of the data replication process.

Figure 4:
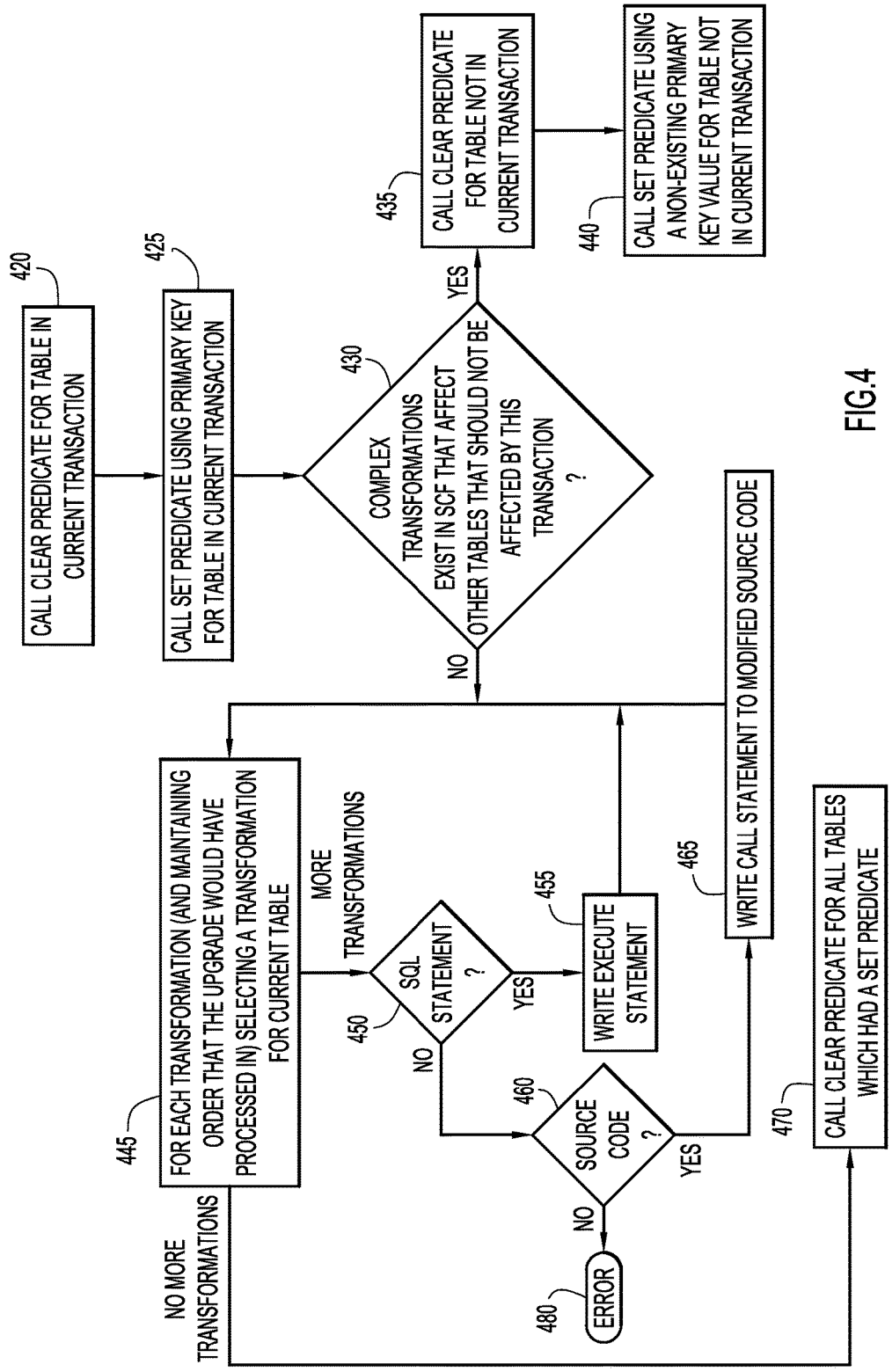
FIG. 4 is a procedural flowchart showing example operations of creating a user exit in accordance with an embodiment of the present invention.

FIG. 4 shows an example flowchart of operations performed by module 65 of creating user exits along with utilizing FGAC during the process of creating subscriptions and user exits. This flowchart is an extension of operation 375 of FIG. 3. A subscription is a replication object file which may have callouts to a user exit, which may have been generated for complex transformations that transform data from the source system 300 into a compatible format with the target system 400. In some embodiments, a user exit can have an embedded user exit, e.g., a user exit within a user exit. By identifying such instructions and generating modified source code, e.g., to perform transformations in a programming language different from the programming language of the system, automation of complex transformations is achieved and manual analysis of source code is avoided.

Operations 420-440 and 470 involve aspects of FGAC, while operations 450-465 involve creation of commands within a user exit. At operation 420, a clear predicate FGAC command is created for the main (current) table involved in the transformation transaction. At operation 425, a set predicate FGAC command is created for the main transaction table using a primary key. In some embodiments, the primary key is used to identify a row of data, allowing data manipulation to occur only for that row. At operation 430, if a complex transformation exists in the SCF that affects other tables (that should not be affected by this transaction, a clear predicate FGAC command is created at operation 435 for tables not in the current transaction, and a set predicate FGAC command is created using a non-existing primary key value at operation 440. By utilizing FGAC, these related tables will not be affected by the transaction. The process (operations 430-440) continues until all complex transformations for related tables have been evaluated.

The process continues at operation 445, in which a transformation is selected, and each transformation is evaluated in the order that the upgrade would have been processed in (e.g., applying transformations in a particular order to specific data based upon the process order previously established). At operation 450, if the transformation is determined to comprise an SQL statement, then the process continues at operation 455, in which an SQL command is written to the user exit. At operation 460, if the transformation is determined to comprise a source code statement different from the computing language of the database (e.g., a Java command, or other custom command), then the process continues at operation 465 in which a call statement to a child user exit is written in the parent user exit. If the transformation was evaluated for the presence of SQL statements and source code statements, and it was determined that the transformation did not match either condition, then an error is generated at operation 480.

Accordingly, a subscription may reference a user exit, which comprises a series of executable statements, e.g., from SQL or another executable language, which may be run to transform data into a compatible form with the target system.

Once the relevant statements are written to the user exit, the process continues at operation 445, repeating the process for each transformation provided, until all transformations have been evaluated. Once all transformations have been evaluated, the process continues to operation 470, in which a "clear predicate" FGAC command is called for all tables related to the transaction, e.g., tables for which a set predicate command was issued at operation 440, turning off FGAC, and the process of operation 375 concludes, returning to operation 305.

Figure 5:
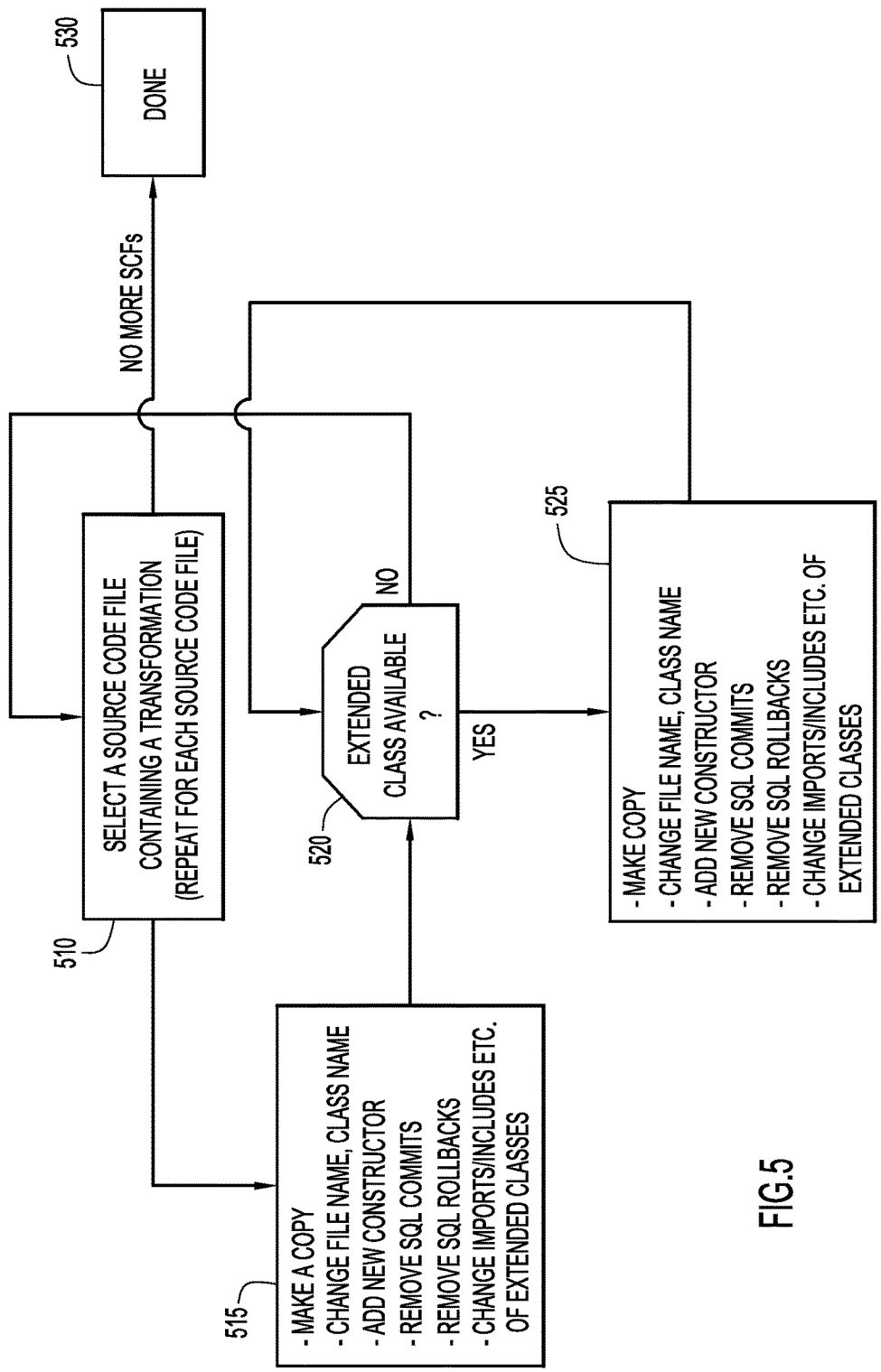
FIG. 5 is a procedural flowchart showing example operations of generating a modified source code file with one or more complex transformations in accordance with an embodiment of the present invention.

FIG. 5 shows an example flowchart of how modified source code is generated for non-SQL transformations, with reference to operation 465 of FIG. 4 and module 65. By generating a modified source code file, transformations may be conducted at a later point in time, as part of a data replication process.

At operation 510, a source code file containing a transformation is selected. At operation 515, a copy of the source file is made, and the file name/class name is changed. New constructors may be added as needed. Operations that are not needed to place the data in a compatible state with the target system (e.g., SQL commits, SQL rollbacks, etc.) may be removed. This process may be repeated for each SCF.

At operation 520, an extended class is selected. Similar to operation 515, a copy of the source code file is made and the file name/class name is changed. New constructors may be added as needed. Operations that are not needed to place the data in a compatible state with the target system (e.g., SQL commits, SQL rollbacks, etc.) may be removed. Change imports or include of extended classes may also be included. This process may be repeated for each extended class.

Once all SCFs have been processed, the process concludes at 530, returning to operation 465. All the complex transformations, e.g., SQL and/or Java source code, will be applied in the order the upgrade would have processed them.

FIGS. 6A-6G show examples of generated source code user exits. The user exit may call out or execute a generated source code file if a table has any complex transformations, e.g., an example output of FIG. 4 may show a set of instructions that may be carried out in order to transform data into a format compatible with a target database 400. This file may be loaded into a data replication system and executed at the time that data replication is being carried out. In general, generated source code files may contain instructions pertaining to FGAC, include one or more user exits, and contain instructions for transforming data using database commands, e.g., SQL commands.

Figure 6B:
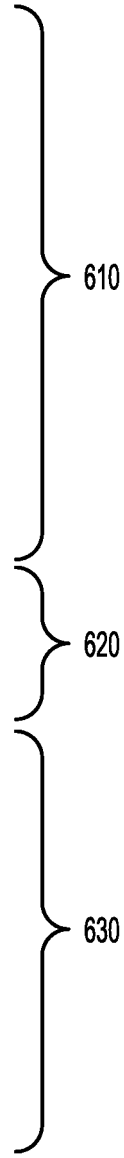
Figure 6E:
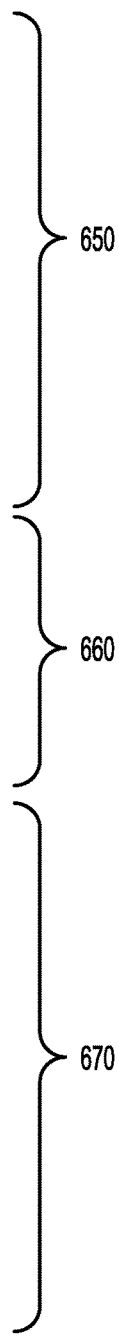

FIGS. 6A-6C show an example of a user exit. Components 610 show aspects of FGAC. A clear predicate call is initially executed for a table called "assetmeter". In this example, the FGAC predicate is set for "assetmeter" using the value of the variable "id", which may be passed in by the replication system. This value is a unique key for this table's transaction, which was passed in from the replication system. Tables associated with "locationmeter" and "measurement" are cleared and then set to a value of "−1". This value does not exist for a unique key in the table, and may be read from a properties file, and is used to indicate that these tables are not to be modified by the current transaction. Accordingly, FGAC allows data only within "assetmeter" to be transformed, with corresponding data in other tables, e.g., "locationmeter" and "measurement", not being affected by execution of the user exit.

Component 620 shows a user exit call to a modified source code file for a complex transformation. SQL statements may be included here (not shown in this example) as well. In this example, a Java file is included for execution. A preferred embodiment may include both SQL statements and modified source code files utilized for automating aspects of the data replication process. Accordingly, this section may include SQL statements as well as modified source code files, e.g., the output of operations 455 and 465 of FIG. 4. When these statements are executed, only "assetmeter", the record that the transaction is for, will be affected. If a source code file contains transformations for more than one table, then FGAC will set the unique key value to a value that does not exist in the target system, preventing these tables from being included in the transaction. This unique key value can be read from a properties file. Modified source code files may include a variety of programming languages including Java, C, XML, Text, etc.

Components 630 show another set of clear predicate commands being issued, turning FGAC off.

FIGS. 6D-6G show additional examples of generated source code, comprising one or more user exits. Components 640 show aspects of FGAC. A clear predicate call is initially executed to clear the predicate for a table called "workorder", which is then selected, e.g., using the value of the variable "id" (a unique key for the table's transaction), which may be passed in by the replication system. In this example, FGAC is only set for the table that this transaction is for, e.g., the workorder table.

Component 650 may include SQL statements, e.g., generated as part of the output of operation 455. Component 660 shows an example of a user exit call to a modified source code file that performs complex transformations, e.g., the output of operation 465 of FIG. 4. Components 670 include calls to SQL commands that are performed on tables other than the table that the transaction is for. In this example, clear and set predicate commands are not called, and therefore, these tables may be accessed by the complex transformation. Component 680 shows aspects of FGAC, e.g., a clear predicate commands is issued, turning FGAC off with regard to table "workorder."

Advantages of present invention embodiments include: dynamically identifying all transformation use cases and generating corresponding transformation objects, accounting for multiple products and version combinations, maintaining transformation logic in the SCF during the data replication process, ensuring the transformation object logic operates on a single row in a table for upgrade purposes by isolating data operations using FGAC, avoiding manual analysis of source code file logic, which is time consuming, cost prohibitive and error prone, and applying transformations in an ordered fashion in a real-time manner. By translating aspects of the data replication process into transformation objects (i.e., code development) in an automated manner, a manual process that was once time consuming and error prone, becomes highly efficient and reduces system down-time.

Preferred embodiments provide for automatically identifying complex transformations and generating subscriptions or mappings for corresponding data transformations. The subscriptions may call source code files (e.g., also referred to as user exits) containing transformations that when executed, transform data stored in a format within the source system into a format compatible with the target system. The subscriptions and associated files may be generated and stored for use at a subsequent point in time, e.g., during the process of data replication.

It will be appreciated that the embodiments described above and illustrated in the drawings represent only a few of the many ways of implementing embodiments for automatically identifying complex transformations and generating subscriptions.

The environment of the present invention embodiments may include any number of computer or other processing systems (e.g., client or end-user systems, source and target systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software (e.g., ordering module 45, subscription generation and FGAC module 65, database difference module 55, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., ordering module 45, subscription generation and FGAC module 65, database difference module 55, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., cached ordered tables, product versions, installation orders, subscriptions, database difference files, etc.). The database system may be implemented by any number of any conventional or other databases, data stores or storage structures (e.g., files, databases, data structures, data or other repositories, etc.) to store information (e.g., cached ordered tables, product versions, installation orders, subscriptions, database difference files, etc.). The database system may be included within or coupled to the server and/or client systems. The database systems and/or storage structures may be remote from or local to the computer or other processing systems, and may store any desired data (e.g., data relating to transactions, data stored in databases, etc.).

The present invention embodiments may employ any number of any type of user interface (e.g., Graphical User Interface (GUI), command-line, prompt, etc.) for obtaining or providing information (e.g., cached ordered tables, product versions, installation orders, subscriptions, database difference files, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., cached ordered tables, product versions, installation orders, subscriptions, database difference files, etc.).

The present invention embodiments are not limited to the specific tasks or algorithms described above, but may be utilized for migration processes in general.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for data replication comprising:
at least one processor configured to:
identify one or more complex data transformations within database statements from source code files of installed software products on a target system, wherein the source code files on the target system are updated versions relative to corresponding ones of a source system, wherein the identified one or more complex data transformations are stored in an order reflecting an order of installation of the source code files on the target system, and wherein the one or more complex data transformations include one or more from a group of: moving data from plural table columns to a common table column, moving data from plural database tables to a common database table, and changing column data using a formula;
create a subscription for each complex data transformation, the subscription containing generated instructions executable on the target system for transforming data within the source system into a form compatible with the target system according to the complex data transformation; and
execute the instructions of the subscriptions within the target system during data replication from the source system to the target system to perform the complex data transformations in the order reflecting the order of installation of the source code files and transform source data of the source system into a form compatible with the target system.

2. The system of claim 1, wherein the subscription comprises one or more references to one or more executable files containing instructions for transforming data of the source system into a form compatible with the target system, the instructions comprising generated source code.

3. The system of claim 2, wherein the one or more executable files further comprise instructions providing fine grain access control to individual items of data to be transformed, the fine grain access control specifying instructions for controlling access to one or more particular tables of data, rows of data, columns of data or variables to be transformed.

4. The system of claim 3, wherein the fine grain access control includes, for a plurality of tables to be impacted by the complex data transformation:
determining a subset of the plurality of tables comprising data that is not to be transformed;
inactivating access to the subset of tables; and
performing the complex data transformation only on the tables that have not been inactivated.

5. The system of claim 2, wherein the at least one processor is configured to:
select a source code file of the target system containing a complex data transformation;
update source code of the source code file to transform data of the source system into a form compatible with the target system; and
save the updated source code.

6. The system of claim 1, wherein the at least one processor is configured to:
obtain the order of installation of the source code files on the target system;
parse the source code files in the order of installation to identify a corresponding order of the complex data transformations; and
generate a cache of complex data transformations, wherein each table in the cache lists the identified complex data transformations in the corresponding order based on the respective source code file.

7. The system of claim 1, wherein the at least one processor is configured to:
generate a report listing differences between the source system and the target system;
identify from the report, items of data that are present within the target system; and
generate a subscription for each complex data transformation having a corresponding item of data in the target system.

8. A computer program product for data replication comprising a computer readable storage medium having computer readable program instructions embodied therewith, the computer readable program instructions, when executed by a processor, cause the processor to:
identify one or more complex data transformations within database statements from source code files of installed software products on a target system, wherein the source code files on the target system are updated versions relative to corresponding ones of a source system, wherein the identified one or more complex data transformations are stored in an order reflecting an order of installation of the source code files on the target system, and wherein the one or more complex data transformations include one or more from a group of: moving data from plural table columns to a common table column, moving data from plural database tables to a common database table, and changing column data using a formula;
create a subscription for each complex data transformation, the subscription containing generated instructions executable on the target system for transforming data within the source system into a form compatible with the target system according to the complex data transformation; and
execute the instructions of the subscriptions within the target system during data replication from the source system to the target system to perform the complex data transformations in the order reflecting the order of installation of the source code files and transform source data of the source system into a form compatible with the target system.

9. The computer program product of claim 8, wherein the subscription comprises one or more references to one or more executable files containing instructions for transforming data of the source system into a form compatible with the target system, the instructions comprising generated source code.

10. The computer program product of claim 9, wherein the one or more executable files further comprise instructions providing fine grain access control to individual items of data to be transformed, the fine grain access control specifying instructions for controlling access to one or more particular tables of data, rows of data, columns of data or variables to be transformed.

11. The computer program product of claim 10, wherein the fine grain access control includes, for a plurality of tables identified to be impacted by the complex data transformation:
determining a subset of the plurality of tables comprising data that is not to be transformed;
inactivating access to the subset of tables; and
performing the complex data transformation only on the tables that have not been inactivated.

12. The computer program product of claim 9, wherein the computer program product is configured to cause the processor to:
select a source code file of the target system containing a complex data transformation;
update source code of the source code file to transform data of the source system into a form compatible with the target system; and
save the updated source code file.

13. The computer program product of claim 8, wherein the computer program product is configured to cause the processor to:
obtain the order of installation of the source code files on the target system;
parse the source code files in the order of installation to identify a corresponding order of the complex data transformations; and
generate a cache of complex data transformations, wherein each table in the cache lists the identified complex data transformations in the corresponding order based on the respective source code file.

14. The computer program product of claim 8, wherein the computer program product is configured to cause the processor to:
generate a report listing differences between the source system and the target system;
identify from the report, items of data that are present within the target system; and
generate a subscription for each complex data transformation having a corresponding item of data in the target system.

* * * * *